United States Patent
Chen et al.

(10) Patent No.: US 7,397,612 B2
(45) Date of Patent: Jul. 8, 2008

(54) OPTICAL SYSTEM FOR TAKING IMAGE

(75) Inventors: Chun Shan Chen, Taichung (TW);
Ming Ching Lin, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 0 days.

(21) Appl. No.: 11/562,603

(22) Filed: Nov. 22, 2006

(65) Prior Publication Data
US 2008/0084618 A1    Apr. 10, 2008

(30) Foreign Application Priority Data
Oct. 5, 2006  (TW) .............................. 95137128 A

(51) Int. Cl.
*G02B 13/18* (2006.01)
*G02B 9/12* (2006.01)
(52) U.S. Cl. ...................... 359/716; 359/784
(58) Field of Classification Search .............. 359/716, 359/784, 715, 714
See application file for complete search history.

(56) References Cited

U.S. PATENT DOCUMENTS 5,223,982 A * 6/1993 Suzuki et al. ............... 359/716
6,040,943 A * 3/2000 Schaub ....................... 359/565

* cited by examiner

*Primary Examiner*—Scott J Sugarman
(74) *Attorney, Agent, or Firm*—Banger Shia

(57) ABSTRACT

An optical system for taking image comprises three lens elements with refractive power, from the object side to the image side: a first lens element with negative refractive power, a second lens element with positive refractive power, and a third lens element with positive refractive power, wherein an aperture stop is located behind the first lens element, each of at least two lens elements is provided with at least one aspheric surface. By such arrangements, the optical system can obtain a good image quality, maintain enough back focal length and increase the field of view of the optical system.

8 Claims, 4 Drawing Sheets

OPTICAL SYSTEM FOR TAKING IMAGE

BACKGROUND OF THE INVENTION

1. Field of the Invention

The present invention relates to an optical system for taking image, and more particularly to a miniaturized optical system for taking image used in a PC camera.

2. Description of the Prior Art

In recent years, with the popularity of electronic image taking equipment, such as the PC camera, and the camera mobile phone, the optical system for taking image has been becoming thinner and thinner, and the photosensitive assembly of an ordinary digital camera is nothing more than CCD (Charge Coupled Device) or CMOS (Complementary Metal Oxide Semiconductor). Due to the advancement of the semiconductor technique, the pixel size of photosensitive assembly has been being reduced continuously, and the development of the miniaturized optical system for taking image is toward the high resolution field. Therefore, the demand for the image quality becomes increasingly urgent.

A common optical system for a PC camera is usually arranged in such a manner that the front lens group is negative and the rear lens group is positive, namely, a so-called inverse telephoto structure, so as to obtain a wide field of view. And to reduce the incident angle of the light with respect to the photosensitive assembly, the refractive power of the rear lens group should be improved. Usually, an ordinary rear lens group consists of two plano-convex lens elements with convex surfaces facing each other, this is a so-called RAMSDAN structure. The front lens group has negative refractive power and the rear lens group has positive refractive power, and this is an inverse telephoto. The conventional optical system here particularly refers to RAMSDAN structure of the inverse telephoto, and this structure has the following disadvantages:

The incident angle of the light with respect to the front surface of the second lens of the rear lens group is too large, and as a result, the sensitivity will be increased comparatively, and the light at this position is likely to be divergent. Therefore, the system will not be stable.

The present invention has arisen to mitigate and/or obviate the afore-described disadvantages.

SUMMARY OF THE INVENTION

To improve the image quality of the optical system and to effectively reduce the size of the lens assembly while providing a long enough back focal length and increasing the field of view, the present invention provides a brand new three-lens type optical system.

An optical system for taking image comprises three lens elements with refractive power, from the object side to the image side:

a first lens element with negative refractive power;
a second lens element with positive refractive power;
a third lens element with positive refractive power;
wherein an aperture stop is located behind the first lens element, each of at least two lens elements is provided with at least one aspheric surface.

In the optical system for taking image, the first lens element with negative refractive power serves to increase the field of view of the optical system, the second lens element with positive refractive power serves to provide refractive power to the optical system and to correct the aberrations caused by the optical system, and the third lens element with positive refractive power serves as a correcting lens to balance and correct the various aberrations caused by the optical system.

The aperture stop is located close to the object side, so that the exit pupil of the optical system will be far away from the image plane. Therefore, the light will be projected onto the photosensitive assembly with a relatively small incident angle, and this is the telecentric feature of the image side, and this feature is very important to the photosensitive power of the current solid photosensitive assembly, and can improve the photosensitivity of the photosensitive assembly while reducing the probability of the occurrence of shading. In addition, for a wide-angle optical system, it particularly needs to correct the distortion and the chromatic aberration of magnification, the correction method is to arrange the aperture stop at the balance point of the refractive power of the optical system. And the aperture stop of the optical system of the present invention is located behind the first lens element, the purpose of such an arrangement is to balance the telecentric and wide field of view. And it will be better if the aperture stop is arranged between the first lens element and the second lens element.

With the trend of miniaturization of the optical lens assembly and the requirement of increasing the field of view, the focal length of the optical system is becoming shorter. Therefore, the radius of curvature and the size of the lens elements must be reduced, and it is impossible to make such glass lenses by the use of the conventional grind method. Plastic material is introduced to make lenses by injection molding, using a relatively low cost to produce high precision lenses. The surface of lens is aspheric for obtaining much more controlled variables, so as to reduce the aberration and the number of the lenses.

In the optical system of the present invention, the focal length of the first lens element is f1, the focal length of the optical system for taking image is f, and they satisfy the relation:

$$|f/f1|<1.2$$

The first lens element with negative refractive power serves to increase the field of view of the optical system, however, if the value of $|f/f1|$ exceeds the limitation value as mentioned above, the high order aberration will be too great. Therefore, it would be better if the value of $|f/f1|$ satisfied the following relation:

$$0.6<f/f1<0.8$$

In the optical system of the present invention, the focal length of the second lens element is f2, the focal length of the optical system for taking image is f, and they satisfy the relation:

$$1.2<f/f2<3.0.$$

If the value of f/f2 is smaller than the low limit as stated above, the total height of the optical system will be too great, and this will be counter to the objective of miniaturization of the optical system for taking image. And if the value of f/f2 is greater than the abovementioned high limit, it will produce too much high order aberration.

In the optical system of the present invention, the focal length of the third lens element is f3, the focal length of the optical system for taking image is f, and they satisfy the relation:

$$0<f/f3<0.8.$$

If the value of f/f3 is kept within the scope as stated above, the optical system can obtain an appropriate back focal length, and the astigmatism and distortion caused by the optical system can be corrected effectively. Therefore, it would be better if the value of f/f3 satisfied the relation:

$$0.2 < f/f3 < 0.3$$

In the optical system of the present invention, the radius of curvature of the front surface of the first lens element is R11, the radius of curvature of the rear surface of the first lens element is R12, and they satisfy the relation:

$$1.5 < (R11+R12)/(R11-R12) < 2.0.$$

If the value of (R11+R12)/(R11−R12) exceeds the high limit as stated above, the value of R11 will be relatively great, and as a result, the total height of the optical system will be too great. If the value of (R11+R12)/(R11−R12) is smaller than the low limit as stated above, the value of R11 will be relatively small, and as a result, the field of view of the optical system will be too small.

In the optical system of the present invention, the image height of the optical system is ImgH, the focal length of the optical system for taking image is f, the tangential angle at the position of the effective diameter of a rear surface of the first lens element is ANG 12, and they satisfy the relations:

$$ImgH/f > 0.45$$

$$ANG12 > 40 \text{ deg}$$

The tangential angle at the position of the effective diameter of the surface is defined as: The angle between the line perpendicular to the optical axis and the tangential line at the position of the surface. When the tangential angle at the position of the effective diameter of the surface is inclined toward the image side, the tangential angle is positive, and when the tangential angle at the position of the effective diameter of the surface is inclined toward the object side, the tangential angle is negative. The abovementioned relations can enable the optical system of the present invention to have a relatively wide field of view.

In the optical system of the present invention, the radius of curvature of the rear surface of the second lens element is R22, the focal length of the optical system for taking image is f, and they satisfy the relations:

$$|R22/f| < 0.5$$

$$R22 < 1 \text{ mm}$$

The abovementioned relations can reduce the total height of the optical system.

In the optical system of the present invention, the refractive index of the first lens element is N1, the refractive index of the second lens element is N2, and they satisfy the following relations:

$$N1 > 1.55$$

$$1.53 < N2 < 1.6$$

The abovementioned relations can enable the optical system of the present invention to obtain an appropriate refractive power and to find appropriate plastic optical material to match the optical system.

In the optical system of the present invention, the Abbe number of the second lens element is V2, and it satisfies the relation:

$$V2 > 50$$

The above abovementioned relation can effectively correct the chromatic aberration caused by the optical system while improving the resolution of the optical system for taking image.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
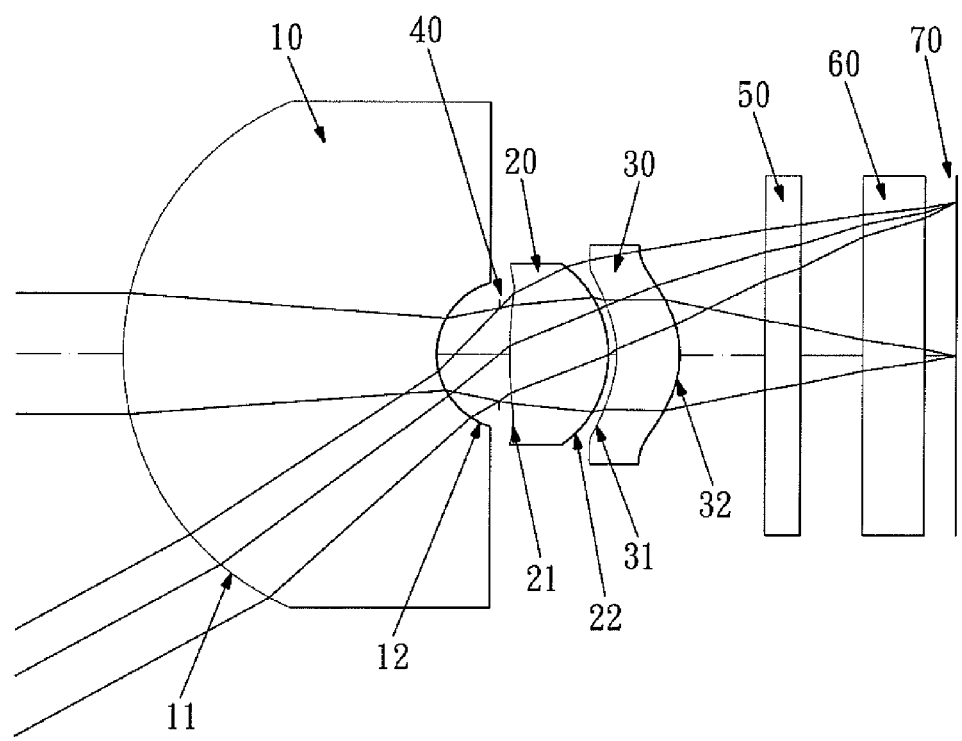
FIG. 1 shows an optical system for taking image in accordance with a first embodiment of the present invention.
Figure 2:
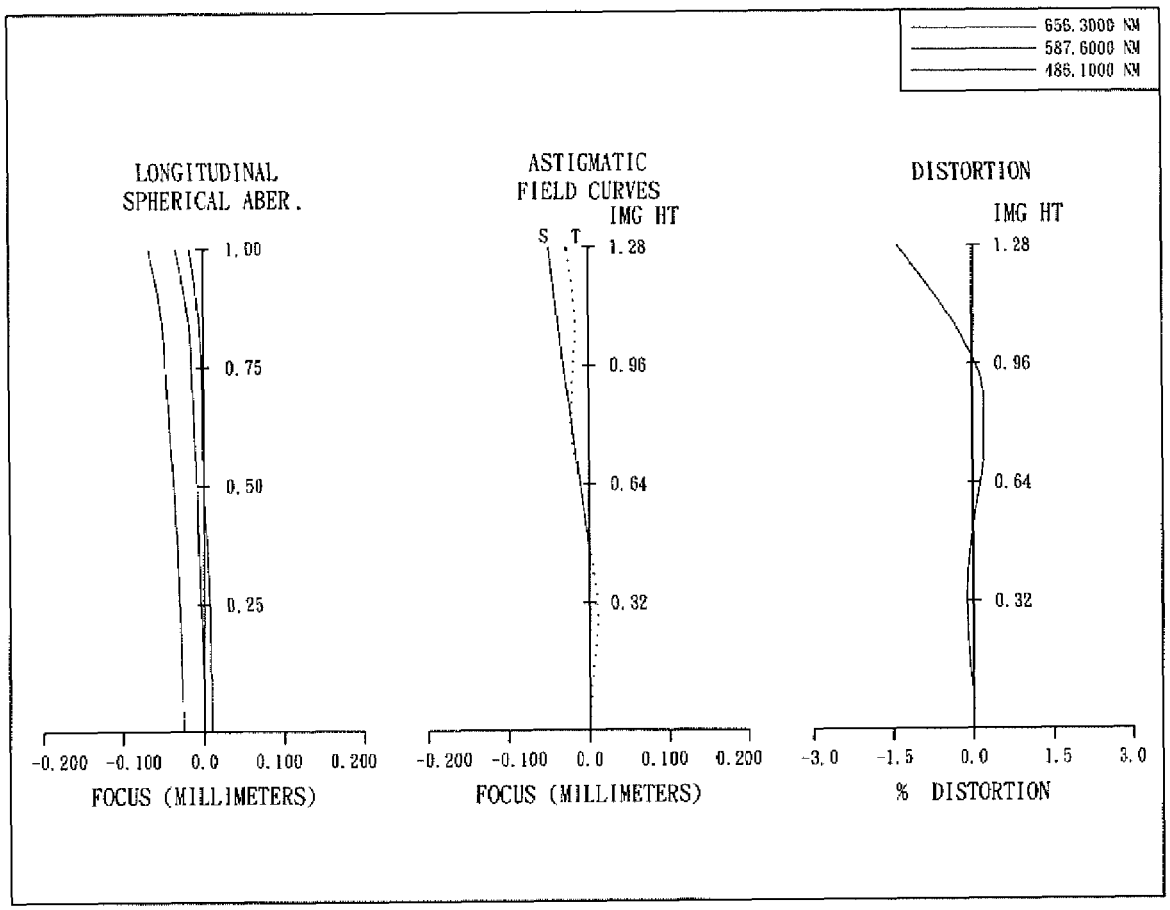
FIG. 2 shows the aberration curve of the first embodiment of the present invention.

Referring to FIG. 1, which shows an optical system for taking image in accordance with a first embodiment of the present invention, and FIG. 2 shows the aberration curve of the first embodiment of the present invention. The first embodiment of the present invention is an optical system for taking image comprising three lens elements with refractive power, and the optical system for taking image comprises, from the object side to the image side:

A plastic first lens element 10 has negative refractive power, and both the front surface 11 and the rear surface 12 of the first lens element 10 are aspheric.

A plastic second lens element 20 has positive refractive power, and both the front surface 21 and the rear surface 22 of the second lens element 20 are aspheric.

A plastic third lens element 30 with positive refractive power, and both the front surface 31 and the rear surface 32 of the third lens element 30 are aspheric.

An aperture stop 40 is located between the first lens element 10 and the second lens element 20 for controlling brightness of the optical system.

An IR cut filter 50 is located behind the third lens element 30 and has no influence on the focal length of the optical system for taking image.

A protective glass 60 is located behind the IR cut filter 50 and doesn't affect the focal length of the optical system for taking image.

And an image plane 70 is located behind the protective glass 60.

The equation of the curve of the aspheric surfaces is expressed as follows:

$$X(Y) = (Y^2/R)/(1+sqrt(1-(1+k)*(Y/R)^2)) + A_4*Y^4 + A_6*Y^6 +$$

wherein:

X: represents the distance of the cross section of the lens;

Y: the height from the point on the curve of the aspheric surface to the optical axis;

K: represents the conical coefficients;

$A_4, A_6 \ldots$: the aspheric surface coefficients of the fourth and sixth order.

In the optical system for taking image of the first embodiment, the focal length of the first lens element is f1, the focal length of the second lens element is f2, the focal length of the third lens element is f3, the focal length of the optical system for taking image is f, and they satisfy the relations: |f/f1|=0.70, f/f2=1.83, f/f3=0.24.

In the optical system for taking image of the first embodiment, the radius of curvature of the front surface of the first lens element is R11, and the radius of curvature of the rear surface of the first lens element is R12, and they satisfy the relation: (R11+R12)/(R11−R12)=1.74.

In the optical system for taking image of the first embodiment, the radius of curvature of the rear surface of the second lens element is R22, the focal length of the optical system for taking image is f, and they satisfy the relations: |R22/f|=0.34, R22=−0.79612 [mm].

the relation: N1=1.583, and the refractive index of the second lens element N2 satisfies the relation: N2=1.543.

In the optical system for taking image of the first embodiment, the Abbe number of the second lens element is V2, V2=60.3.

The data of the structure of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f = 2.32 mm, Fno = 2.3, HFOV = 29.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.35732 (ASP) | 2.566 | Plastic | 1.583 | 30.2 | −3.31 |
| 2 | | 0.63578 (ASP) | 0.504 | | | | |
| 3 | Ape. Stop | Plano | 0.100 | | | | |
| 4 | Lens 2 | 3.33060 (ASP) | 0.800 | Plastic | 1.543 | 60.3 | 1.27 |
| 5 | | −0.79612 (ASP) | 0.070 | | | | |
| 6 | Lens3 | −0.94612 (ASP) | 0.509 | Plastic | 1.53 | 55.8 | 9.54 |
| 7 | | −0.94544 (ASP) | 0.700 | | | | |
| 8 | IR-filter | Plano | 0.300 | Glass | 1.517 | 64.1 | — |
| 9 | | Plano | 0.500 | | | | |
| 10 | Cover Glass | Plano | 0.500 | Glass | 1.497 | 81.6 | — |
| 11 | | Plano | 0.248 | | | | |
| 12 | Image | Plano | | | | | |

TABLE 2

Aspheric Coefficient

| | Surface # | | | | | |
|---|---|---|---|---|---|---|
| | 1 | 2 | 4 | 5 | 6 | 7 |
| K = | — | −9.07099E−01 | — | −5.08201E−01 | — | −1.12459E+00 |
| A4 = | −5.21160E−04 | 4.96825E−01 | −1.50601E−01 | 1.98434E−02 | 1.58606E−01 | −1.90327E−02 |
| A6 = | 1.78461E−03 | 7.77828E−01 | −4.05584E−02 | 5.52466E−01 | 5.63126E−01 | 1.92100E−02 |
| A8 = | −5.18023E−04 | 1.24805E+00 | −7.43785E−01 | −1.35823E+00 | −1.20772E−02 | 1.80596E−01 |
| A10 = | 7.41240E−05 | 5.07108E+00 | 1.14642E+00 | 1.10492E+00 | 1.51556E−01 | 5.80370E−02 |
| A12 = | — | −2.03344E−06 | 4.17264E−01 | −1.00791E−02 | — | — |
| A14 = | — | — | −1.76854E+00 | — | — | — |

In the optical system for taking image of the first embodiment, the image height is ImgH, the focal length of the optical system for taking image is f, and they satisfy the relation: ImgH/f=0.55.

In the optical system for taking image of the first embodiment, the tangential angle ANG12 at the position of the effective diameter of the rear surface of the first lens element satisfies the relation: ANG12=57.2 [deg.] The tangential angle at the position of the effective diameter of the surface is defined as: The angle between the line perpendicular to the optical axis and the tangential line at the position the surface. When the tangential angle at the position of the effective diameter of the surface is inclined toward the image side, the tangential angle is positive, and when the tangential angle at the position of the effective diameter of the surface is inclined toward the object side, the tangential angle is negative.

Figure 3:
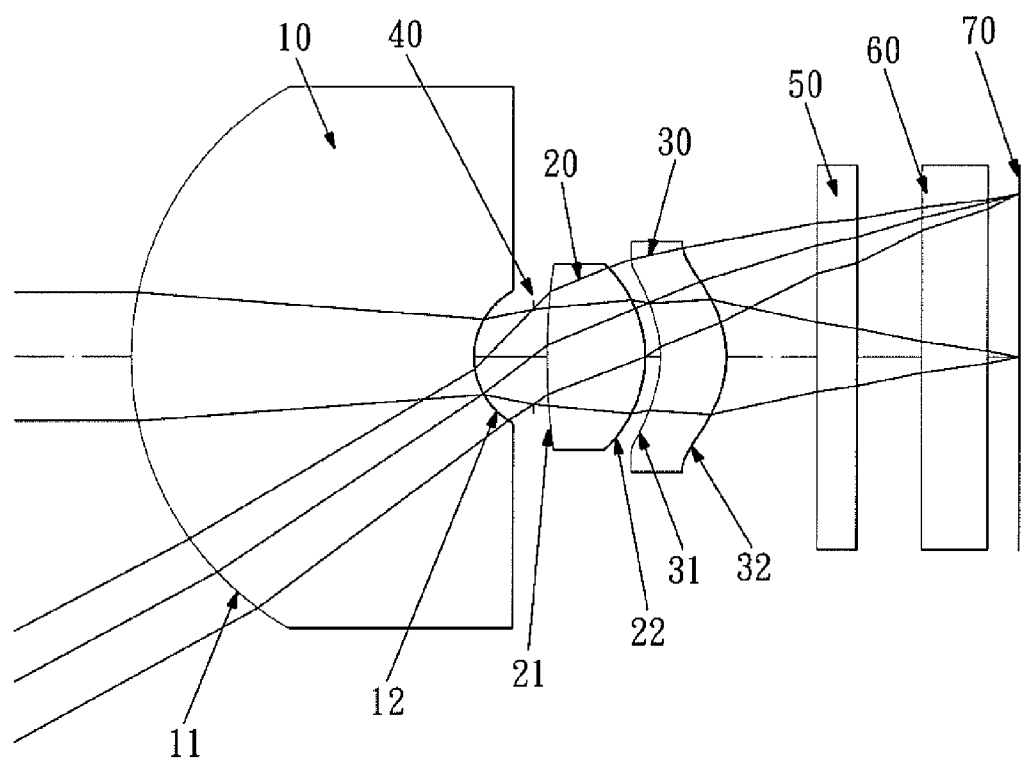
FIG. 3 shows an optical system for taking image in accordance with a second embodiment of the present invention.
Figure 4:
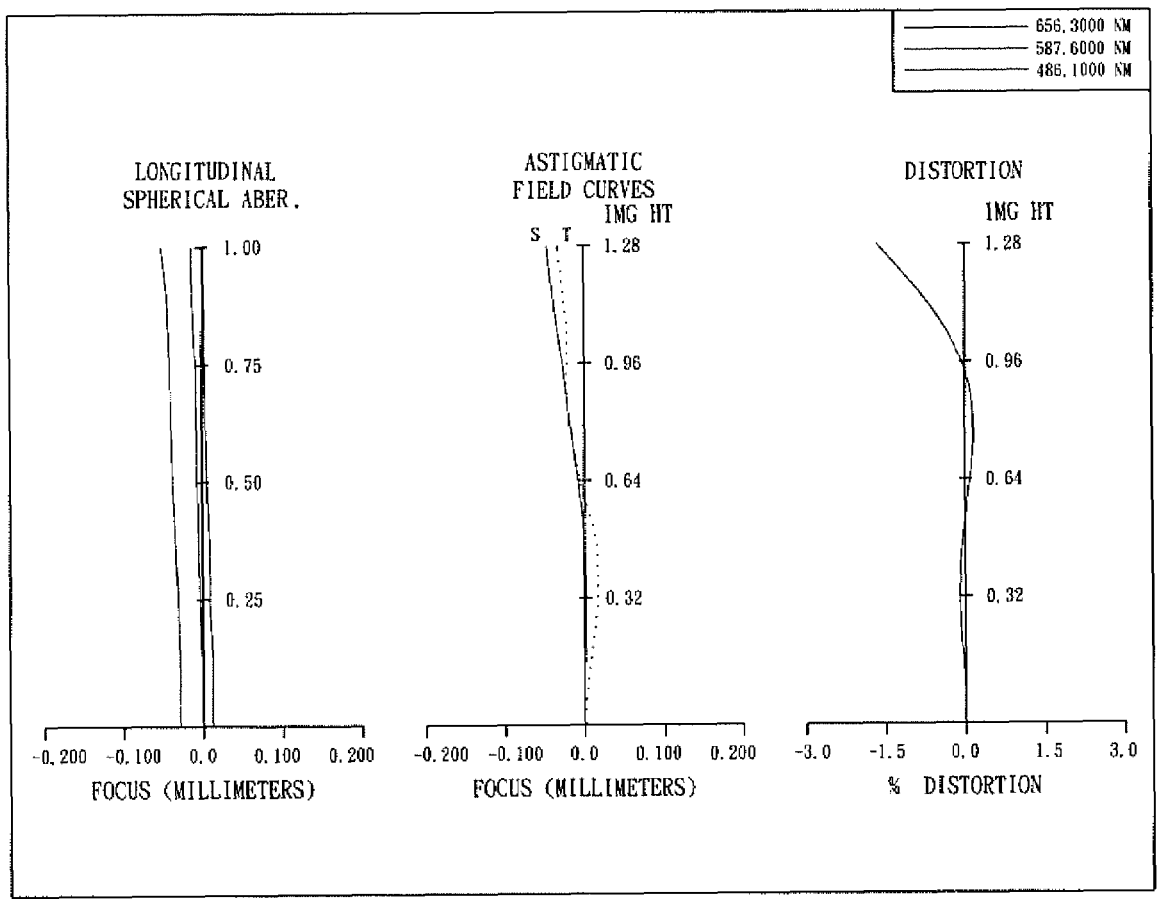
FIG. 4 shows the aberration curve of the second embodiment of the present invention.

In the optical system for taking image of the first embodiment, the refractive index of the first lens element N1 satisfies Referring to FIG. 3, which shows an optical system for taking image in accordance with a second embodiment of the present invention, and FIG. 4 shows the aberration curve of the second embodiment of the present invention. The second embodiment of the present invention is an optical system for taking image comprising three lens elements with refractive power, and the optical system for taking image comprises: from the object side to the image side:

A plastic first lens element 10 has negative refractive power, and both the front surface 11 and the rear surface 12 of the first lens element 10 are aspheric.

A plastic second lens element 20 has positive refractive power, and both the front surface 21 and the rear surface 22 of the second lens element 20 are aspheric.

A plastic third lens element 30 with positive refractive power, and both the front surface 31 and the rear surface 32 of the third lens element 30 are aspheric.

An aperture stop 40 is located between the first lens element 10 and the second lens element 20 for controlling brightness of the optical system.

An IR cut filter 50 is located behind the third lens element 30 and has no influence on the focal length of the optical system for taking image.

A protective glass 60 is located behind the IR cut filter 50 and doesn't affect the focal length of the optical system for taking image.

And an image plane 70 is located behind the protective glass 60.

The equation of the curve of the aspheric surfaces of the second embodiment is the same as that of the first embodiment.

In the optical system for taking image of the second embodiment, the focal length of the first lens element is f1, the focal length of the second lens element is f2, the focal length of the third lens element is f3, and the focal length of the optical system for taking image is f, they satisfy the relations: $|f/f1|=0.71, f/f2=1.95, f/f3=0.25$.

In the optical system for taking image of the second embodiment, the radius of curvature of the front surface of the first lens element is R11, and the radius of curvature of the rear surface of the first lens element is R12, and they satisfy the relation: $(R11+R12)/(R11-R12)=1.76$.

In the optical system for taking image of the second embodiment, the radius of curvature of the rear surface of the second lens element is R22, the focal length of the optical system for taking image is f, and they satisfy the relations: $|R22/f|=0.32, R22=-0.79590$ [mm].

In the optical system for taking image of the second embodiment, the image height is ImgH, the focal length of the optical system for taking image is f, and they satisfy the relation: $ImgH/f=0.51$.

In the optical system for taking image of the second embodiment, the tangential angle ANG12 at the position of the effective diameter of the rear surface of the first lens element satisfies the relation: $ANG12=54.9$ [deg.] The definition of the tangential angle ANG12 is the same as the first embodiment.

In the optical system for taking image of the second embodiment, the refractive index of the first lens element N1 satisfies the relation: $N1=1.583$, and the refractive index of the second lens element N2 satisfies the relation: $N2=1.543$.

In the optical system for taking image of the second embodiment, the Abbe number of the second lens element is V2, $V2=60.3$.

The data of the structure of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f = 2.49 mm, Fno = 2.5, HFOV = 27.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.33176 (ASP) | 2.611 | Plastic | 1.583 | 30.2 | −3.51 |
| 2 | | 0.64018 (ASP) | 0.453 | | | | |
| 3 | Ape. Stop | Plano | 0.100 | | | | |
| 4 | Lens 2 | 3.53020 (ASP) | 0.773 | Plastic | 1.543 | 60.3 | 1.28 |
| 5 | | −0.79590 (ASP) | 0.116 | | | | |
| 6 | Lens3 | −0.93578 (ASP) | 0.498 | Plastic | 1.53 | 55.8 | 10.02 |
| 7 | | −0.94228 (ASP) | 0.700 | | | | |
| 8 | IR-filter | Plano | 0.300 | Glass | 1.517 | 64.1 | — |
| 9 | | Plano | 0.500 | | | | |
| 10 | Cover Glass | Plano | 0.500 | Glass | 1.497 | 81.6 | — |
| 11 | | Plano | 0.239 | | | | |
| 12 | Image | Plano | | | | | |

TABLE 4

Aspheric Coefficient

| | Surface # | | | | | |
|---|---|---|---|---|---|---|
| | 1 | 2 | 4 | 5 | 6 | 7 |
| K = | — | −8.02095E−01 | — | −4.92432E−01 | — | −1.15940E+00 |
| A4 = | −4.99044E−04 | 4.98922E−01 | −1.28846E−01 | 2.35415E−03 | 1.67401E−01 | −1.53077E−02 |
| A6 = | 1.79458E−03 | 1.14472E+00 | 1.01232E−01 | 5.42696E−01 | 5.69381E−01 | 1.36591E−02 |
| A8 = | −5.24468E−04 | −4.46110E−01 | −3.98189E−01 | −1.26943E+00 | −1.30602E−02 | 1.69718E−01 |
| A10 = | 7.57863E−05 | 1.31510E+01 | 7.73520E−01 | 1.32146E+00 | 1.63696E−01 | 5.31748E−02 |
| A12 = | — | −2.39035E−06 | 4.17264E−01 | −1.00794E−02 | — | — |
| A14 = | — | — | −1.76854E+00 | | | |

TABLE 5

|  | Embodiment 1 | Embodiment 2 |
| --- | --- | --- |
| f | 2.32 | 2.49 |
| Fno | 2.3 | 2.5 |
| HFOV | 29.3 | 27.7 |
| \|f/f1\| | 0.70 | 0.71 |
| f/f2 | 1.83 | 1.95 |
| f/f3 | 0.24 | 0.25 |
| (R11 + R12)/(R11 − R12) | 1.74 | 1.76 |
| \|R22/f\| | 0.34 | 0.32 |
| ImgH/f | 0.55 | 0.51 |
| ANG12 | 57.2 | 54.9 |
| N1 | 1.583 | 1.583 |
| N2 | 1.543 | 1.543 |
| V2 | 60.3 | 60.3 |
| R22 | −0.79612 | −0.79590 |

It is to be noted that the tables 1-4 show different data of the different embodiments, however, the data of the different embodiments is obtained from experiments. Therefore, any product of the same structure is contemplated to be within the scope of the present invention even if it uses different data. Table 5 is the data of the respective embodiments resulted from the equations.

While we have shown and described various embodiments in accordance with the present invention, it is clear to those skilled in the art that further embodiments may be made without departing from the scope of the present invention.

What is claimed is:

1. An optical system for taking image comprising three lens elements with refractive power, from the object side to the image side:

a first lens element with negative refractive power;

a second lens element with positive refractive power;

a third lens element with positive refractive power;

wherein an aperture stop is located behind the first lens element, any two of the first lens element, the second lens element and the third element are provided with at least one aspheric surface;

a focal length of the second lens element is f2, a focal length of the optical system is f, and the satisfy the relation: $1.2 < f/f2 < 3.0$.

2. The optical system for taking image as claimed in claim 1, wherein a focal length of the first lens element is f1, a focal length of the third lens element is f3, the focal length of the optical system for taking image is f, and they satisfy the relations:

$|f/f1| < 1.2$ $0 < f/f3 < 0.8$.

3. The optical system for taking image as claimed in claim 1, wherein the image height of the optical system is ImgH, the focal length of the optical system for taking image is f, a tangential angle at a position of an effective diameter of a rear surface of the first lens element is ANG12, and they satisfy the relations:

$ImgH/f > 0.45$ $ANG12 > 40$ deg.

4. The optical system for taking image as claimed in claim 3, wherein a radius of curvature of the front surface of the first lens element is R11, a radius of curvature of the rear surface of the first lens element is R12, and they satisfy the relation: $1.5 < (R11+R12)/(R11-R12) < 2.0$.

5. The optical system for taking image as claimed in claim 4, wherein a radius of curvature of the rear surface of the second lens element is R22, the focal length of the optical system for taking image is f, and they satisfy the relation: $|R22/f| > 0.5$.

6. The optical system for taking image as claimed in claim 3, wherein a refractive index of the second lens element is N2, an Abbe number of the second lens element is V2, and they satisfy the relations:

$1.53 < N2 < 1.6$ $V2 > 50$.

7. The optical system for taking image as claimed in claim 6, wherein a refractive index of the first lens element is N1, and it satisfies the relation:

$N1 > 1.55$.

8. The optical system for taking image as claimed in claim 7, wherein the focal length of the first lens element is f1, the focal length of the third lens element is f3, the focal length of the optical system for taking image is f, a radius of curvature of the rear surface of the second lens element is R22, and they satisfy the following relations:

$0.6 < |f/f1| < 0.8$ $0.2 < f/f3 < 0.3$ $R22 < 1$ mm.

* * * * *